United States Patent [19]
Lermann et al.

[11] 4,221,474
[45] Sep. 9, 1980

[54] PHOTOGRAPHIC CAMERA WITH FOCUSSING SYSTEM WHICH TIME-MULTIPLEXES THE SIGNALS FROM PLURAL PHOTODETECTORS

[75] Inventors: Peter Lermann, P. Feldkirchen; Istvan Cocron, Munich; Eduard Wagensonner; Kurt Borowski, both of Aschheim; Theodor Huber, Munich, all of Fed. Rep. of Germany

[73] Assignee: AGFA-Gevaert AG, Leverkusen, Fed. Rep. of Germany

[21] Appl. No.: 5,091

[22] Filed: Jan. 22, 1979

[30] Foreign Application Priority Data

Jan. 23, 1978 [DE] Fed. Rep. of Germany ....... 2802708

[51] Int. Cl.³ .............................................. G03B 13/18
[52] U.S. Cl. .................................. 354/23 D; 354/25; 354/31
[58] Field of Search ................... 354/25, 31, 23 D, 53, 354/602, 195, 198, 289, 162, 165; 352/140; 356/1, 4, 5; 353/101; 250/201, 204; 314/33

[56] References Cited
U.S. PATENT DOCUMENTS

| | | | |
|---|---|---|---|
| 3,610,934 | 10/1971 | Turner | 250/201 |
| 3,836,919 | 9/1974 | Matsumoto et al. | 354/25 |
| 4,126,870 | 11/1978 | Kondo | 354/25 |

Primary Examiner—John Gonzales
Assistant Examiner—William B. Perkey
Attorney, Agent, or Firm—Michael J. Striker

[57] ABSTRACT

An infrared measuring beam is emitted from the camera towards the subject, and reflected back as a tiny light spot projected, by an optics which transversely shifts in dependence upon exposure-objective subject-distance setting, onto one, the other or both of two infrared photodiodes. The signals from the two photodiodes are transmitted in processed form to two output flip-flops through the intermediary of a single, shared signal-processing stage, employing time-division-multiplexed transmission of the two photodiode signals, to assure that the signal processing of the two photodiode output signals be as identical as possible.

22 Claims, 3 Drawing Figures

PHOTOGRAPHIC CAMERA WITH FOCUSSING SYSTEM WHICH TIME-MULTIPLEXES THE SIGNALS FROM PLURAL PHOTODETECTORS

BACKGROUND OF THE INVENTION

The present invention concerns focussing systems for photographic still or motion-picture cameras, the systems being of the type which in dependence upon true camera-to-subject distance automatically adjust the subject-distance setting of the camera's exposure objective and/or provide the user with an indication of the direction in which he should manually move the camera's focus adjuster member. More particularly, the invention concerns focussing systems of the type in which a signal source directs towards the subject a beam of electromagnetic radiation, with a receiver matched to the signal source and receiving the radiation reflected back from the subject. The receiver comprises radiation detectors located side by side, and an optics located in front of the side-by-side radiation detectors, shiftable relative to the radiation detectors, and coupled to the exposure objective or focus adjuster structure of the camera to be shifted in dependence upon the subject-distance setting of the objective; alternatively, the optics just mentioned is non-shiftable, and the side-by-side radiation detectors are mounted shiftable and coupled to focus adjuster structure of the exposure objective.

SUMMARY OF THE INVENTION

It is one general object of the invention to provide a focussing system of the type just identified operative for generating on the basis of triangulation the focus-control information needed for automatic or semiautomatic focussing, in a simple way requiring little expense and a minimum of moving parts. Furthermore, the effects of various potential sources of interference signals and noise are to be suppressed to the maximum extent possible when performing the signal-evaluation procedures attendant to the generation of the requisite focus-control information.

In accordance with one concept of the present invention, use is made of a two-input one-output first multiplexer stage, and of a one-input two-output second multiplexer stage. The two inputs of the first multiplexer stage are connected to respective ones of the side-by-side-arranged radiation detectors. The output of the first multiplexer stage is connected to the input of a signal-processing branch comprising amplifier and filter stages, and the output of the signal-processing stage is connected to the input of the second multiplexer stage. The two outputs of the second multiplexer stage are connected to the inputs of respective ones of two output storage stages, such as flip-flops. Information derived from each of the two radiation detectors is transmitted to a respective one of the two output storage stages through the first multiplexer stage, the intermediate and common signal-processing stage, and through the second multiplexer stage. The two multiplexer stages alternately assume their first states and then their second stages. When in their first states, the information from the first radiation detector is transmitted to the first output storage stage; then the two multiplexer stages assume their second states, and the information from the second radiation detector is transmitted to the second output storage stage. Accordingly, the information from the two radiation detectors is transmitted to the two output storage stages, e.g., flip-flops, through a common or shared signal-processing circuit, on a time-division-multiplexed basis.

The radiation emitter is activated periodically, and the output flip-flops, or more generally storage stages, are reset at the latest just as the radiation emitter is activated.

In the preferred embodiment, the reflected-back radiation is concentrated into a tiny light spot, which shifts back and forth between the two side-by-side radiation detectors in dependence upon changing subject distance and changing subject-distance setting of the exposure objective, and for the sake of simplicity the system mainly differentiates between three states, one in which only one radiation detector is illuminated by the light spot, the second in which only the other is thusly illuminated, and the third in which both are equally illuminated. For this reason, each output storage stage can, in the preferred embodiment, be a simple one-bit-capacity flip-flop. In principle, however, more extensive information could be drawn from the side-by-side radiation detectors, for example a quantitative indication of the amount of light incident on each, expressed digitally, this then requiring that each output storage stage be capable of registering a number of more than one bit.

The states of the two output flip-flops are used, for example through the intermediary of interconnected logic gates and/or comparators, to control the operation of an automatic focus adjuster motor, or the like, which automatically adjusts the subject-distance setting of the camera, and/or to drive an indicator system which informs the user of the direction in which he himself should manually move the camera's focus adjuster member to correct the camera's state of focus.

The changes of state of the first and second multiplexer stages needed to effect the time-division-multiplexing, and also the resetting of the output storage stages and the activation of the radiation transmitter, are preferably all controlled from a centralized timer stage; for best possible definition of the relative timing of the various changes of stage of all the various elements involved.

Preferably, the centralized timer stage comprises a clocked gating stage which is clocked at a predetermined frequency by pulses exhibiting a predetermined on-off ratio.

The use of the time-division-multiplexing technique disclosed herein has the advantage that it makes possible reductions in the numbers of various necessary circuit stages, such as amplifiers; and likewise the filtering performed upon the signals transmitted through both transmission channels of the system is performed by one and the same filtering and amplification state. Besides the very advantageous elimination of various circuit components, especially capacitors, this technique maximizes the extent to which the signals in the two transmission channels of the system will be identically amplified, processed and evaluated.

Additionally, the time-division-multiplexing technique employed herein has the advantage that it tends to considerably improve the signal-to-noise ration of the system, which is particularly important in a focussing system which emits relatively low strength electromagnetic radiation for performance of a subject-distance measurement. Preferably, the two multiplexer stages each comprise two switching stages, one of which is conductive while the other not, and vice versa, i.e., the two switching stages within each multiplexer stage are alternately conductive. During the non-conduction intervals of each such switching stage, no signal transmission whatsoever is permitted to occur, greatly reducing the possibility of the erroneous transmission and/or evaluation of interference signals at such times.

The use of clocked digital output storage stages has the advantage that when the second-multiplexer-stage output from which one such storage stage has just received data goes non-conductive, such data can continue to be held and employed to control the system's indicator and/or adjuster motor, i.e., during the time that the other storage stage is receiving data from the other output of the second multiplexer stage, and likewise during the time intervals in which neither of the two output storage stages is receiving data from the second multiplexer stage.

Besides the preferred use of only two side-by-side radiation detectors, and the determination of which of them (if not both nor neither) is in receipt of the reflected-back light spot, it would also be possible, for example, to employ a series of such side-by-side radiation detector elements, to generate higher-resolution information concerning the position of the light spot in that way, or, as already referred to, to derive from each of only two radiation detectors data quantitatively characterizing the amount of measuring radiation incident on each, feeding this information in digital form to two digital output storage stages capable of storing this quantitative information, and then generating focus-control information by, for example, subtraction of the quantities registered by the two output storage stages.

However, the use of only two side-by-side radiation detector elements, preferably infrared-responsive photodiodes, is particularly preferred, and it is in that case furthermore preferred that the reflected-back light projected onto one or both of them be concentrated into a very small light spot, much smaller in cross-sectional area than the radiation-responsive surfaces of the two side-by-side detector elements, in order to maximize the binary character of the operation of the system.

According to a further concept of the present invention, each radiation detector, in the form of an infrared photodiode, is connected to the input of a differential amplifier connected to operate in short-circuit or shunt mode, with its amplification factor for D.C. signal components not permitted to exceed a certain value, and with its gain for A.C. signal components higher than such value. The operation of the differential amplifiers with their respective infrared photodiodes in short-circuit or shunt mode has the advantage that a linear increase of incident radiation intensity will tend to be linearly, not logarithmically processed. Employing differing D.C. and A.C. gains for the differential amplifiers has the advantage that the D.C.-signal-component amplification, while not entirely suppressed, is kept within bounds, so that the differential amplifiers will not be driven into saturation by the relatively great infrared light component of ordinary daylight. Instead, the signal amplification and transmission employed is mainly A.C. and therefore preferentially responsive to the pulsewise transmitted infrared measuring radiation, i.e., to the pulsewise aspect of it. The amplifiers can also be provided in the common connection between the two multiplexer stages.

Advantageously, in the event that operational amplifiers are used for the differential amplifiers, their inverting inputs are connected to the infrared diodes, with their feedback branches containing several high-resistance resistors, the junction between two such resistors in such a branch having connected to it one terminal of a by-pass capacitor whose other terminal is connected to the grounded non-inverting input of the respective operational amplifier. The by-pass capacitor has the result that the gain of the amplifier rises in proportion to the frequency of the A.C. signal component applied to it. Preferably, an A.C. amplifier is connected between the output of each such differential amplifier and the respective one of the two inputs of the first multiplexer stage.

According to a particularly preferred embodiment of the invention, the clocked gating stage used as the central timer stage of the focussing system comprises an oscillator or pulse generator and a counter operating as a frequency divider, preferably a pulse-flank-triggered counter, the last output of which, alone or in conjunction with a preceding output of the counter, is used to develop the reset signal for the counter. The last output of the counter is connected to one input of a transmitter gate which has a further input connected to the output of the oscillator, with the signal produced at the output of this transmitter gate being used to activate the infrared transmitting element, preferably an infrared-radiating diode.

Advantageously, the output of the oscillator is not connected to such input of the transmitter gate directly, but rather via an intermediate gate having a further input connected to a further output of the counter, in order to increase the duration of the time interval intermediate infrared emissions; in this way, during each counting cycle of the counter, the transmitter gate receices only one pulse from the oscillator or pulse generator.

Preferably, the transmitter gate has a further input to which is connected the output of a time-delay stage which keeps the transmitter gate initially disabled upon initial power-connect or switch-on, until after the elapse of a start-up time interval long enough to assure that the oscillator of the central timing stage has time enough to establish itself at its designed frequency. It will be understood that the infrared transmitting diode must be matched to the designed frequency of the oscillator in so far as the diode's power-dissipation limits and its load limits are concerned. During the start-up time of the oscillator, if countermeasures such as the one just referred to were not taken, the infrared transmitting diode could be too heavily loaded.

According to a particularly preferred concept of the invention, the counter of the central timer stage is an n-bit or n-output counter, and its $n^{th}$ output plus also one other of its outputs are connected to the inputs of an AND-gate, whose output in turn is connected to the reset input of the counter. This serves to match the pulse phase of the last output of the counter and the pulse phase of such other output of the counter, and the pulse phase of the pulses produced at the last, i.e., $n^{th}$, output of the counter can be shortened correspondingly.

According to a further concept, the last output of the counter is connected to the clock input of a first bistable stage, preferably a D-flip-flop, and the next-to-last output of the counter is connected to the clock input of a second such bistable stage, likewise preferably a D-flip-flop. The second bistable stage is so configured that its mutually complementary output terminals (e.g., Q and $\overline{Q}$ outputs, in the case of a D-flip-flop) undergo an exchange of output signals (i.e., from "0" and "1" to "1" and "0") with the appearance of the rising flank of the pulse produced at the next-to-last output of the counter. The two, mutually complementary outputs of this second bistable stage are connected to respective ones of two inputs of a gating stage, the latter having two outputs connected to the control inputs of respective ones of the two switching stages internal to the second multiplexer stage, the signals applied from the outputs of the second bistable stage to this gating stage serving to prepare the gating stage for activation of one or the other of the two switching stages, with the signal which actually causes the gating stage to activate one of the two switching stages coming from the first of the two bistable stages in question. In this way, with each rising flank of a pulse produced at the next-to-last output of the counter, one or the other of the two switching stages within the second multiplexer is rendered conductive, with the two switching stages of the second multiplexer being rendered conductive alternately. The amplifier and filter stages connected to the output of the first multiplexer fully respond to the signal which the second multiplexer is to transmit, before transmission by the second multiplexer, due to the fact that the first multiplexer (i.e., one or the other switching stage therein) is rendered conductive in advance of the second multilexer (i.e., one or the other switching stage within the second multiplexer); accordingly, when the second multiplexer then transmits the output signal from such amplifier and filter stages, during a conduction time interval shorter than that of the first multiplexer, the signal to be transmitted will already have been fully developed by the amplifier and filter stages. Thus, the first multiplexer (i.e., one or the other switching stage therein) is rendered conductive before the emission of an infrared pulse and also before the second multiplexer is rendered conductive. As already stated, the first multiplexer is conductive for a longer time interval than the second; this contributes markedly to a reduction in the effects of various potential sources of interference and noise.

Preferably, the aforementioned second bistable stage, i.e., the one whose mutually complementary outputs undergo an interchange of output signals in response to each pulse from the next-to-last output of the timing counter, is a D-flip-flop with its $\overline{Q}$ (inverse) output connected to its D-input; this results in the output-signal interchange in question.

Advantageously, the aforementioned gating stage whose outputs are connected to the two switching stages of the second multiplexer, is comprised of two AND-gates. The two AND-gates have respective first inputs connected in common to the Q output of the first D-flip-flop, and respective second inputs connected to respective ones of the two, mutually complementary outputs of the second D-flip-flop. The outputs of these two AND-gates are then connected to the control inputs of respective ones of the two switching stages of the second multiplexer.

According to a further concept of the invention, the outputs of these two last-mentioned AND-gates are furthermore connected to the first inputs of respective ones of two further AND-gates, whose second inputs are connected in common to the output of a time-delay stage whose input is connected to the last output of the timing counter. The outputs of these two further AND-gates, then, are connected to the reset inputs of respective ones of the two digital output storage stages, which using the simple binary technique presently preferred are each comprised of a single clocked D-flip-flop. In this way, the two digital output storage stages will always be reset prior to reception of the reflected-back radiation and, thereafter, set once again, i.e., assuming that the received signal again results in this. The brief time interval during which both output storage stages are in enforced reset stage can readily be made so brief as to be visually imperceptible, i.e., for the case where the output storage stages drive an indicating system which informs the user of the direction in which he should manually adjust the subject-distance setting.

As an alternative to controlling such an indicator, or in addition thereto, the signals stored by the digital output storage stages can be used to control the energization of an adjusting motor which itself performs the requisite adjustment of subject-distance setting.

As already stated, it is presently preferred that the stored signals be simple binary one-bit signals, in which case each digital output storage stage can be a single D-flip-flop storing a signal merely indicating whether its associated receiver diode is or is not in receipt of the aforementioned tiny light spot. In that case, it is preferred to evaluate the stages of the two output flip-flops using two evaluating gates. One evaluating gate has an input connected to the Q output of the first output flip-flop, and another input connected to the $\overline{Q}$ (inverse) output of the second output flip-flop. The other evaluating gate has an input connected to the Q output of the second flip-flop and a further input connected to a limit switch responsive to the infinite-subject-distance setting of the exposure objective. The outputs of the two evaluating gates are connected to respective ones of the two inputs of the indicator-control or motor-control stage of the system. This serves the following purpose. When the present subject-distance setting of the exposure objective is too short by a non-negligible amount compared to the true camera-to-subject distance, the light spot referred to above will be incident on one of the two receiver diodes, and not the other; and this latter fact will be indicated to the user as an instruction to change the subject-distance setting in the direction of longer distances, and/or will energize the adjusting motor to make this change automatically. However, if the true camera-to-subject distance is so great that the light spot incident on such single receiver diode is too low in intensity to be detected, then the unchanged fact that the other receiver diode, here again, is not in receipt of the light spot, will once more result in the same indication to the user and/or in motorized focus adjustment in the direction of longer subject-distance settings. Then, when the exposure objective has been adjusted to infinite subject-distance setting, the aforementioned limit switch closes, i.e., closes in general when the infinite-distance setting has been reached. The result is the application of a signal to the aforementioned one of the two evaluating gates having the effect of a simulation of a system-equilibrium state, i.e., so that the adjusting motor become deenergized and not continue to attempt to increase the subject-distance setting, and more importantly in the case of an indicator system to inform the user that the subject-distance setting is now correct, namely as correct as it can be under the circumstances.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
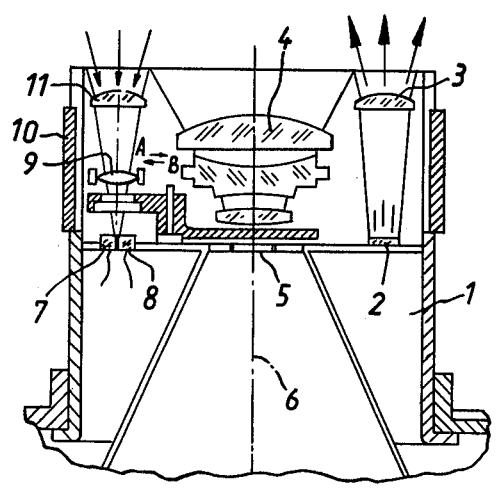
FIGS. 1 and 2 depict a first exemplary embodiment of the invention.

In FIG. 1, reference numeral 1 denotes the housing of a photographic still or motion-picture camera whose objective tube contains an infrared-emitting diode 2. The infrared radiation emitted from transmitter diode 2 is condensed by a condensor or collector optics 3 located in front of it. Numeral 4 denotes the camera's exposure objective, and numeral 5 a fixed aperture behind it. The optical axis of the exposure objective is denoted by numeral 6.

Two infrared-responsive receiver diodes are denoted by numerals 7 and 8. Located in front of these is an optics 9 mounted coupled to the focus adjuster structure of the camera such that when the subject-distance setting of exposure objective 4 is varied, e.g., by turning the camera's focus adjuster ring 10, the optics 9 coupled thereto shifts in the direction of one or the other of arrows A and B, depending upon the direction in which the focus adjuster ring 10 is turned. The infrared measurement radiation reflected back to the camera from the subject is condensed by a collector optics 11, and the optics 9 and 11 cooperates to bundle together the rays of the reflected-back infrared radiation into an infrared-light spot incident upon the receiver diodes 7, 8, the spot being of very small size compared to the photo-sensitive surfaces of each of the two diodes 7, 8. The type of optical system illustrated is subject-distance-dependent on the basis of trigonomic triangulation. As already stated, turning of focus adjuster ring 10 in one or the other direction, besides changing the subject-distance setting of exposure objective 4, furthermore shifts optics 9 in the direction A or B. If the subject-distance to which exposure objective 4 has been set in truth corresponds to the actual subject-distance, then the infrared-light spot projected by optics 9 is projected equally onto adjoining portions of the two adjoining receiver diodes 7, 8; if, with the objective 4 thusly at the proper setting, focus adjuster ring 10 is then, for whatever reason, turned in one direction or the other, optics 9 shifts in direction A or B, causing the light spot to shift onto just one or the other of the two receiver diodes 7, 8.

Figure 2:
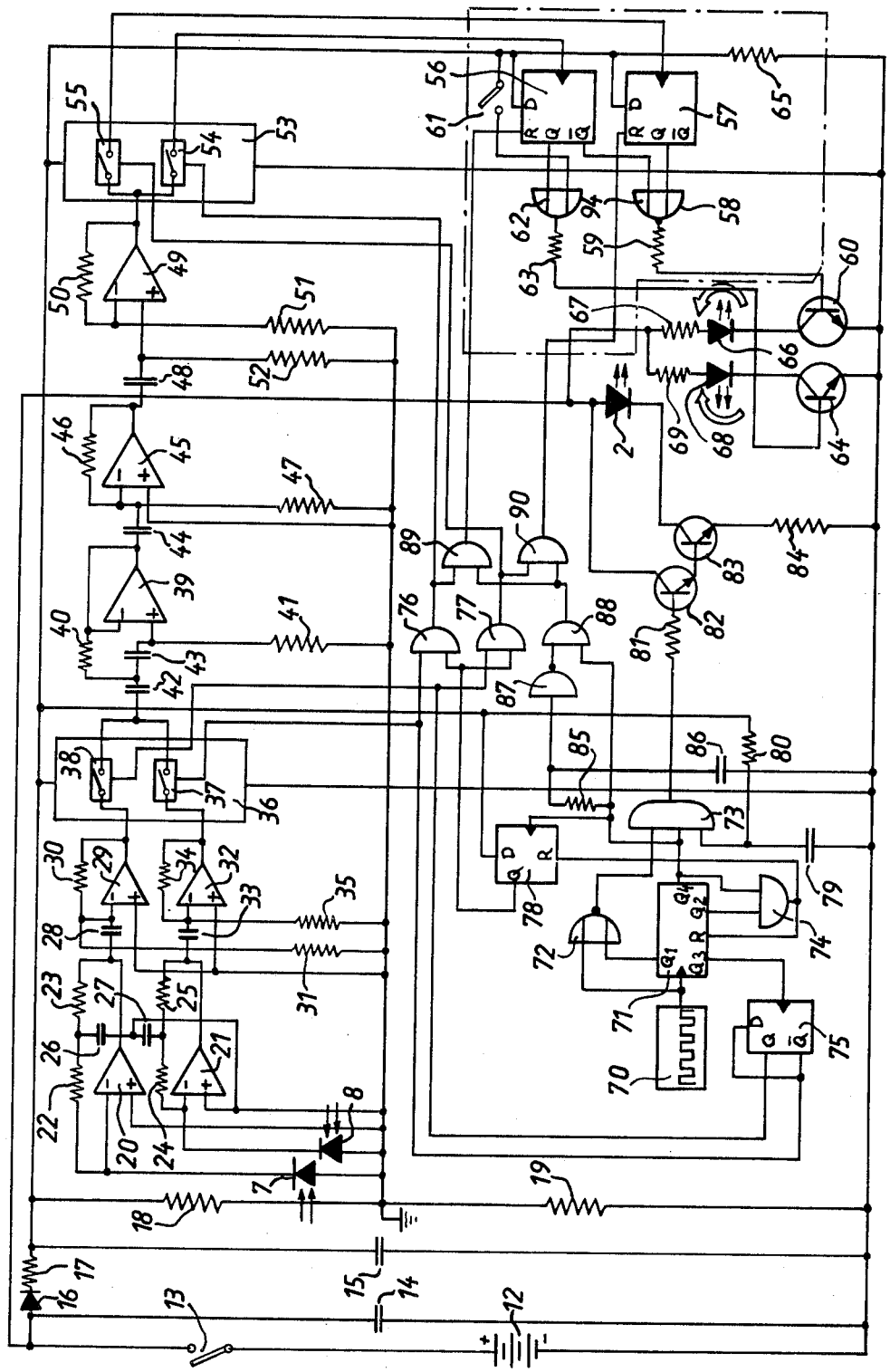

The infrared-emitting transmitter diode 2 and the infrared-responsive receiver diodes 7, 8 are connected to a signal-processing and control circuit, an exemplary embodiment of which is depicted in FIG. 2.

In FIG. 2, numeral 12 denotes a battery, connectable by means of a power-connect switch 13 to the remainder of the illustrated circuitry. Numerals 14 and 15 denote capacitors serving to stabilize the supply voltage furnished to the circuitry, numerals 16 and 17 a diode and a resistor connected in series therewith and contributing to the same purpose. Two resistors 18, 19 of equal resistance value are connected in series across the supply voltage, to establish a symmetrical zero-voltage level for a part of the illustrated circuitry.

The infrared receiver diode 7 is connected at its cathode to the inverting input of an operational amplifier 20, the anode and non-inverting input of which are connected to ground. Likewise, receiver diode 8 is connected at its cathode to the inverting input of an operational amplifier 21, whose anode and non-inverting input are connected to ground.

The feedback branches of the two operational amplifiers 20, 21 each contain a respective pair of resistors 22, 23 and 24, 25. The two resistor pairs 22, 23 and 24, 25 serve to determine the D.C. signal gains of the two operational amplifiers 20, 21. The taps between resistors 22 and 23 and between 24 and 25 are connected to ground via respective capacitors 26 and 27. This serves to render the A.C. signal gains of the two operational amplifiers 20, 21 frequency-dependent. With increasing frequency, the A.C. impedance of the two capacitors 26, 27 decreases, and accordingly the A.C. signal gain of the two operational amplifiers 20, 21 increases. Preferably, the resistors 22 and 23 are equal in resistance value to the resistors 24 and 25. The same applies for the capacitors 26 and 27.

The illustrated circuit's first receiver channel includes, connected to the output of operational amplifier 20, a coupling capacitor 28 connected to the inverting input of an operational amplifier 29, whose feedback branch contains a resistor 30, which latter together with a further resistor 31 determines the gain of operational amplifier 29. Operational amplifier 29 serves as an A.C. amplifier.

Similar remarks apply to the illustrated circuit's second receiver channel containing an operational amplifier 32 whose inverting input is connected via a coupling capacitor 33 to the output of the operational amplifier 21. The feedback branch of operational amplifier 32 contains a resistor 34, which latter together with a further resistor 35 determines the gain of operational amplifier 32.

Both these receiver channels feed into a multiplexer 36 comprised of two switching stages 37 and 38. Multiplexer stage 36 has two outputs which are connected in common to the input of a high-pass filter comprised of an operational amplifier 39 provided with resistors 40, 41 and capacitors 42, 43. This high-pass filter is designed to suppress interference voltages having a frequency equal to the local line or mains frequency and equal to twice that value and attributable to glow discharge lamps and tubes, or other nearby light sources, being powered off local line voltage.

The high-pass filter 40–43 is connected via a coupling capacitor 44 to an A.C. voltage amplifier comprised of an operational amplifier 45 and feedback resistors 46 and 47. The output of operational amplifier 45 is connected via a coupling capacitor 48 to a further operational amplifier 49 whose gain is determined by two resistors 50, 51. A resistor 52 serves to discharge coupling capacitor 48 when no signal happens to be present.

A second multiplexer 53 comprises two switching stages 54 and 55. Switching stage 54 of multiplexer 53 is connected to the clock input of a D-flip-flop 56, whereas the switching stage 55 of multiplexer 53 is connected to the clock input of a second D-flip-flop 57. These are the output flip-flops of the illustrated signal-processing and control circuit.

The D-inputs of the two flip-flops 56, 57 are both connected to the positive terminal of battery 12.

The Q output of flip-flop 57 and the $\overline{Q}$ output of flip-flop 56 are connected to respective inputs of an OR-gate 58, whose output is connected via a resistor 59 to the base of a transistor 60.

The Q output of flip-flop 56 is connected to one input of an OR-gate 62, whose output is connected via a resistor 63 to the base of a second transistor 64. The other input of OR-gate 62 is connected to the output terminal of a switch 61, whose input terminal is directly connected to the positive terminal of battery 12 and, via a resistor 65, also the negative battery terminal. Switch 61 is coupled to the focus adjuster ring 10 for the camera's exposure objective 4, and closes when the focus adjuster ring 10 has been turned all the way to the subject-distance setting for infinity. In a manner described elsewhere herein, when the true distance to the subject is so great that the light spot projected by optics 9 is so weak that it cannot be detected, the system does not fail, but instead generates a control signal indicating that the objective should be set to longer, as opposed to shorter, subject-distance values, and furthermore when the infinity subject-distance setting is ultimately set switch 61 closes to create a pseudo-equilibrium condition for the system.

Connected in the collector circuit of transistor 60 is a light-emitting diode 66 whose anode is connected via a resistor 67 to the positive terminal of battery 12. Connected in the collector circuit of transistor 64 is a further such LED 68 whose anode is connected via a resistor 69 to the positive battery terminal. The two LED's 66, 68 can, for example, be located behind apertures shaped as curved arrows, one pointing clockwise and the other counterclockwise, so that when one of the two LED's lights up, the user is informed of the direction in which he, and/or the camera's adjusting motor, should turn the focus adjuster ring 10 to correct the camera's state of focus.

Numeral 70 denotes a pulse generator whose output is connected to the clock input of a counter 71. The first output Q1 of counter 71 is connected to one input of a NOR-gate 72, whose other input is connected to the output of pulse generator 70. The output of NOR-gate 72 is connected to the first input of an AND-gate 73, hereafter referred to as the transmitter gate 73. Control potential is applied to the input of transmitter gate 73 with a frequency based upon the frequency of pulse generator 70 but delayed relative thereto by the pulse phase time interval of the pulses produced on counter output Q1. The second input of transmitter gate 73 is directly connected to output Q4 of counter 71. The pulse phase of the pulses produced at counter output Q4 is shorter than that of the pulses produced on counter output Q3. Additionally, output Q4 and also a further output Q2 are connected to respective inputs of an AND-gate 72, whose output is connected to the reset input R of counter 71, and accordingly the pulse phase of the pulses produced at output Q4 is equal to that of the pulses produced at output Q2.

From output Q3 of counter 71 a control connection leads to the clock input of a D-flip-flop 75, whose D-input is connected to the $\overline{Q}$ output of the selfsame flip-flop 75. The Q output of D-flip-flop 75 is connected to the control input of the switching stage 38 within multiplexer 36, and the $\overline{Q}$ output of flip-flop 75 is connected to the control input of switching stage 37 within multiplexer 36. The connection of the D-input of flip-flop 75 to the $\overline{Q}$ output thereof has the result that a "1" signal skips from whichever of the two outputs Q, $\overline{Q}$ of flip-flop 75 such signal is presently at, to the other of the two outputs, in response to each rising flank of a pulse produced at output Q3 of counter 71. Intermediate the rising flanks of two successive pulses produced at counter output Q3, it is either the Q or the $\overline{Q}$ output of flip-flop 75 which carries the "1" signal of the flip-flop.

Accordingly, the two switching stages 37, 38 within time multiplexer 36 are rendered conductive alternately, i.e., with stage 37 conductive and stage 38 not, and then vice versa.

Additionally, the Q output of flip-flop 75 is connected to the first input of an AND-gate 76. From the Q output of flip-flop 75, a connection leads to the first input of another such AND-gate 77. The respective second inputs of these two AND-gates 76, 77 are connected in common to the Q output of a further D-flip-flop 78, whose clock input is connected to output Q4 of counter 71. The Q output of flip-flop 78 produces a "1" signal in response to the rising flank of each pulse produced at output Q4 of counter 71. The reset input R of D-flip-flop 78 is connected to the output of the AND-gate 74. Accordingly, D-flip-flop 78 is reset at the end of each Q4 pulse, with the result that the potential at the Q output of flip-flop 78 reverts to "0". Thus, enabling "1" signals are applied to the lower inputs of the two AND-gates 76, 77 with the same rhythm as pulses are produced at output Q4 of counter 71. The outputs of the two AND-gates 76, 77 are connected to the control inputs of the two switching stages 55 and 54 within the second multiplexer stage 53. Whereas multiplexer stage 36 (i.e., one or the other of the two switching stages 37, 38 within it) is already rendered conductive by the rising flank of a Q3 output pulse from counter 71, multiplexer stage 53 (i.e., one or the other of the two switching stages 54, 55 within it) is not rendered conductive until the rising flank of the Q4 output pulse from counter 71. Furthermore, multiplexer stage 36 (i.e., one or the other of the two switching stages 37, 38 within it) stays conductive for a time interval longer than does multiplexer stage 53 (i.e., one or the other of the two switching stages 54, 55 within multiplexer stage 53), in correspondence to the fact that flip-flop 75 holds its state until the next counting cycle whereas flip-flop 78 resets in response to the end of the Q4 pulse from counter 71, i.e., resets earlier.

The transmitter gate 73 has a third input connected to the output of a time-delay stage comprised of a capacitor 79 and a resistor 80. The time-constant of time-delay stage 79, 80 is selected to assure that no "1" signal can appear at the output of transmitter gate 73, subsequent to closing of power-connect switch 13, until the oscillator 70 has had sufficient start-up time to establish itself at its designed frequency.

The output of transmitter-AND-gate 73 is connected via a resistor 81 to the base of a transistor 82, whose emitter is connected to the base of a further transistor 83. Numeral 84 denotes an emitter resistor. The infrared-radiation transmitter diode 2, already referred to in connection with FIG. 1, is connected in the collector circuit of transistor 83. Transistor diode 2 is energized with the frequency of the Q4 output pulses from counter 71 and with a pulse phase which is equal to the pulse phase of the pulses from oscillator 70.

Output Q4 of counter 71 is connected, via a time-delay stage comprised of a resistor 85 and a capacitor 86, to the input of an inverter 87, whose output is connected to one input of an AND-gate 88. The other input of AND-gate 88 is directly connected to the Q4 output of counter 71. The output of AND-gate 88 is connected to the lower inputs of two AND-gates 89, 90. The upper input of AND-gate 89 is connected to the output of AND-gate 76, and the upper input of AND-gate 90 to the output of AND-gate 77. The output of AND-gate 89 is connected to the reset input R of the D-flip-flop 56, whereas the output of AND-gate 90 is connected to the reset input R of D-flip-flop 57. A "1" signal is produced at the output of AND-gate 89 during one counting cycle of counter 71, and a "1" signal is produced at the output of AND-gate 90 during the next counting cycle of counter 71, and so forth, i.e., "1" signals appearing at the outputs of these two AND-gates alternately. The "1" signals produced at the outputs of AND-gates 89, 90 serve to reset the D-flip-flops 56,57. In particular, when a "1" signal is produced at the output of one of the two AND-gates 89, 90, it is applied to the reset input R of that one of the two D-flip-flops 56, 57 whose clock input is connected to the just conductive one of the two switching stages 54, 55 of multiplexer 53. The duration of these reset pulses for the two D-flip-flops 56, 57 is determined by the time-constant of the time-delay stage 85, 86. The switching stages 54, 55 within multiplexer stage 53 are rendered conductive periodically, and alternately, each time for the duration of the pulse phase of the pulse produced at the Q4 output of counter 71. During this time interval, and depending upon which one of the two switching stages 54, 55 is the presently conductive one, a signal can be transmitted from the receiver diode 7 to the D-flip-flop 57, or from the receiver diode 8 to the D-flip-flop 56. The storage state of the two D-flip-flops 57 and 56 is double checked at the beginning of each Q4 output pulse from counter 71 by applying the control potential to the reset input R of that one of the two flip-flops 57, 56 which is connected to the just conductive one of the two switching stages within multiplexer 53. If the camera's exposure objective 4 is set to the correct subject-distance setting, and the system in true balance with the light spot produced by optics 9 cast equally onto the adjoining portions of the adjoining receiver diodes 7, 8, both of the two transistors 64 and 60 are conductive, and both LED's 68, 66 are in illuminated state, informing the user that the state of focus is correct. Alternatively, the interconnections of the components in question could be so selected that neither of the two LED's 68, 66 are in illuminated state when the state of focus is correct.

If the true distance to the subject is so great that, the intensity of the light spot cannot be detected by the photodiodes, and assuming that the exposure objective 4 is in fact not yet in its infinity setting, the system operates in exactly the same way as ordinarily, i.e., with LED 66 alone illuminated to inform the user that he should turn focus adjuster ring 10 to longer subject-distance settings, until objective 4 is in fact brought to its maximum subject-distance setting. True system equilibrium has not been achieved. To achieve a pseudo-equilibrium, when the focus adjuster ring 10 reaches infinity setting, switch 61 closes, causing the second LED 68 to light up as well, so that the user be informed that the state of focus is now correct, i.e., as correct as it can be under the circumstances.

Figure 3:
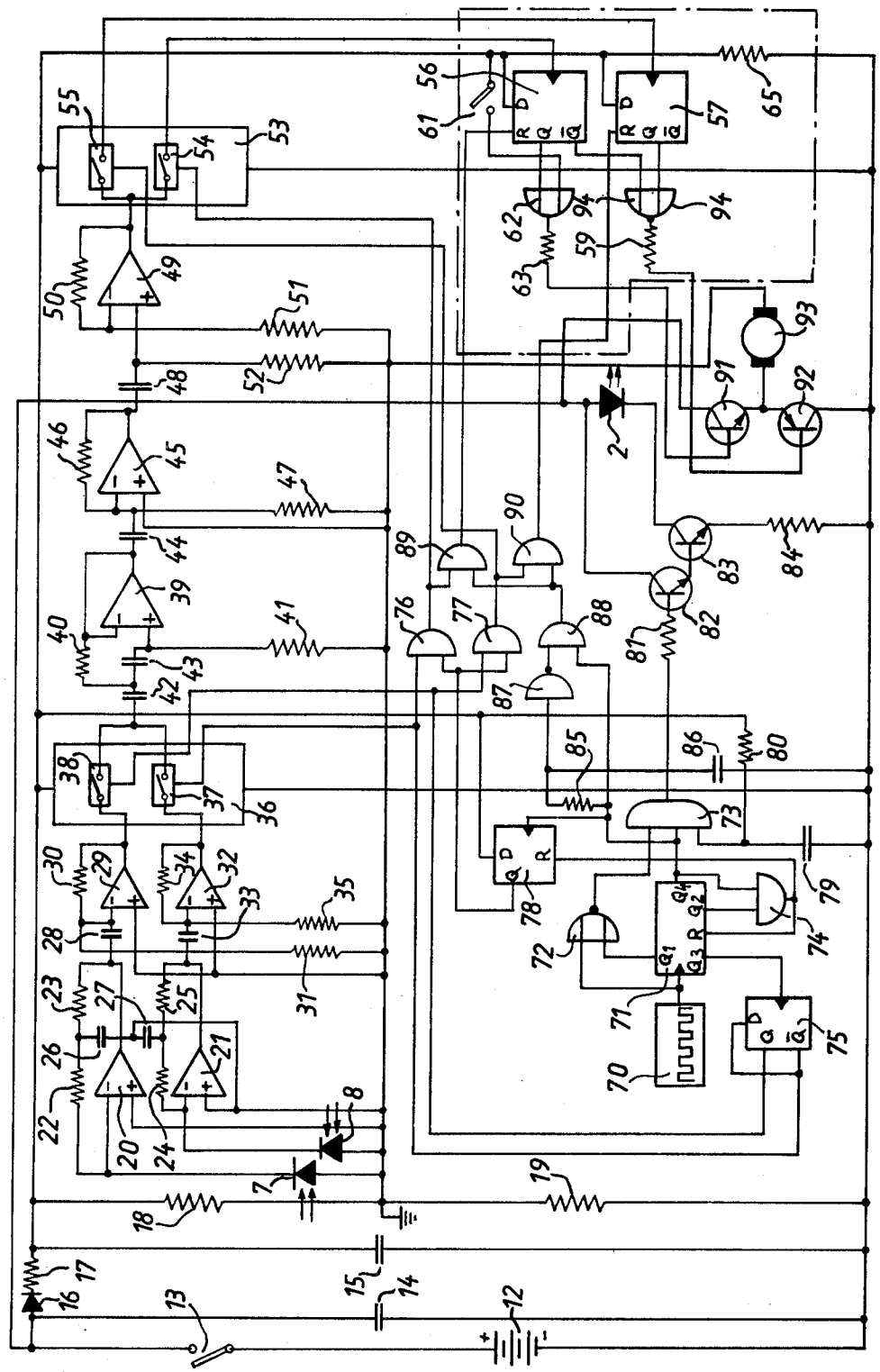
FIG. 3 depicts a modification of the part of the first embodiment depicted in FIG. 2.

In the signal-processing and control circuit shown in FIG. 3, components the same as those shown in FIG. 2 are here identified by the same reference numerals and characters there. Instead of a semiautomatic focussing system which instructs the user how to turn the focussing ring himself, this embodiment contains a rotary electric motor 93 which performs the requisite adjustment motion on its own. A first transistor 91 has its emitter connected to the emitter of a second transistor 92. The two emitters are connected in common to one terminal of the D.C. motor 93, whose other terminal is connected to ground. The collector of transistor 91 is connected to the positive terminal of battery 12, and the collector of transistor 92 is connected to the negative terminal of battery 12. The base of transistor 91 is connected to the output of the OR-gate 62. The base of transistor 92 is connected to the output of a NOR-gate 94 which replaces the OR-gate 58 of FIG. 2. Depending upon the sense of the stage-of-focus error, motor 93 turns left or right as long as needed to shift the optics 9 to a position equally illuminating the two infrared receiver diodes 7, 8. When the state of focus is correct, motor 93 becomes unenergized.

It will be understood that each of the elements described above, or two or more together, may also find a useful application in other types of circuits and constructions differing from the types described above.

While the invention has been illustrated and described as embodied in two exemplary focussing systems, one semiautomatic and the other fully automatic, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In the focussing system of a photographic camera having an exposure objective and subject-distance adjusting means for adjusting the subject-distance setting of the exposure objective, in combination, transmitter means emitting a pulsed beam of electromagnetic radiation from the camera towards a subject to be photographed, so that such beam be reflected from the subject back towards the camera; a receiver structure for receiving the reflected-back beam, including a plurality of light detectors arranged side-by-side and located to receive the reflected-back beam, optical means located in the path of the beam incident upon the light detectors, and means coupled to the adjusting means for effecting relative movement between the optical means and the side-by-side light detectors in dependence upon the subject-distance setting of the adjusting means; and circuit means operative for receiving the signals produced by the light detectors and converting such signals into focus-control information, including shared signal-processing means for processing the signals produced by the plurality of light detectors, digital storage means registering the processed signals, and time-division-multiplexing means operative for effecting time-division-multiplexed transmission of the signals from the plurality of light detectors through the shared signal-processing means to the digital storage means.

2. In a focussing system as defined in claim 1, the time-division-multiplexing means including a first multiplexer means having plural inputs connected to respective ones of the light detectors for receipt of the signals produced by the light detectors and having an output and furthermore including a second multiplexer means having an input and plural outputs, the shared signal-processing means being connected between the output of the first multiplexer means and the input of the second multiplexer means, the digital storage means comprising a plurality of digital signal storage devices each connected to and receiving signals from a respective one of the outputs of the second multiplexer means, and timing means operative for controlling the first and second multiplexer means to route the signals present at successive ones of the plural inputs of the first multiplexer means to the output thereof and to route the signal present at the input of the second multiplexer means to successive ones of the plural outputs of the second multiplexer means.

3. In a focussing system as defined in claim 2, the digital signal storage means being resettable, the timing means furthermore comprising means for timing the emission of the beam by the transmitter means and for resetting at least one of the digital signal storage devices, in a manner that the resetting takes place at a time at least prior to and at most simultaneously with the emission.

4. In a focussing system as defined in claim 3, the signal-processing means comprising amplifier means and filtering means operative for amplifying and filtering the signals transmitted from the first to the second multiplexer means.

5. In a focussing system as defined in claim 2, the plurality of light detectors comprising two light detectors arranged side-by-side, the first multiplexer means having two inputs connected to respective ones of the two light detectors, the second multiplexer means having two outputs, the plurality of digital signal storage devices comprising two digital storage devices one of which is connected to one output and the other to the other output of the second multiplexer means, said optical means comprising optics operative for concentrating the reflected-back beam incident onto the light detectors into a tiny light spot whose area is very small compared to the light-sensitive surfaces of the two light detectors.

6. In a focussing system as defined in claim 4, the light detectors being infrared-radiation-responsive photodiodes, furthermore including a plurality of differential amplifiers, one for each such photodiode, each differential amplifier being connected in shunt mode to receive the output signal of a respective one of the photodiodes, each differential amplifier including means establishing the gain of the amplifier for the A.C. and for the D.C. signal component of the signal produced by the respective photodiode, with the D.C. signal-component gain being limited to a value lower than that of the A.C. signal-component gain.

7. In a focussing system as defined in claim 6, each differential amplifier comprising an operational amplifier having an inverting input and a grounded non-inverting input, each photodiode being connected between the inverting and non-inverting input of the respective operational amplifier, said gain-establishing means comprising for each such operational amplifier a feedback branch containing plural high-resistance resistors connected between the output and the inverting input of the respective operational amplifier and a by-pass capacitor having one terminal connected to the junction between two of such resistors and having another terminal connected to the grounded non-inverting input of the respective operational amplifier.

8. In a focussing system as defined in claim 6, furthermore including a plurality of A.C. amplifiers each having an input connected to the output of a respective one of the differential amplifiers and each having an output connected to a respective one of the inputs of the first multiplexer means.

9. In a focussing system as defined in claim 3, the timing means comprising a pulse generator, a frequency-dividing counter receiving pulses from the pulse generator, and means connected to the counter and responsive to its count and connected to the first and second multiplexer means, to the transmitter means and to the digital storage devices and operative in dependence upon the count achieved by the counter for controlling the first and second multiplexer means to effect said routing of signals, for activating the transmitter means to produce an emission and for resetting the digital storage devices.

10. In a focussing system as defined in claim 9, the counter having plural outputs and producing pulses on successive ones of the plural outputs, and furthermore having a reset input and means connecting the last output of the counter to the reset input thereof, the timing means furthermore including a transmitter gate having an output connected to the transmitter means for activating the latter to effect an emission, the transmitter gate having an input connected to the last output of the counter and a further input connected to the output of the pulse generator.

11. In a focussing system as defined in claim 10, the first-mentioned input of the transmitter gate being connected to the output of the pulse generator via an intermediate gate, the intermediate gate having an output connected to the first-mentioned input of the transmitter gate, one input connected to the output of the pulse generator and a further input connected to one of the other outputs of the counter.

12. In a focussing system as defined in claim 10, the transmitter gate having a still further input, furthermore including time-delay means having an output connected to the still further input of the transmitter gate and operative for keeping the transmitter gate initially disabled upon start-up of the system for a time interval sufficient to permit the pulse generator to reach a steady oscillatory frequency.

13. In a focussing system as defined in claim 10, the means connecting the last output of the counter to the reset input thereof comprising a gate having an input connected to the last output of the counter, another input connected to another output of the counter and an output connected to the reset input of the counter.

14. In a focussing system as defined in claim 10, furthermore including first and second bistable storage devices each having a clock input, the counter having a last output connected to the clock input of the first and a next-to-last output connected to the clock input of the second bistable storage device respectively, the second bistable storage device having two mutually complementary outputs and being connected such that the "1" signal on one of the two mutually complementary outputs jumps to the other of the two mutually complementary outputs in response to the rising flank of a pulse produced at the next-to-last output of the counter, the second multiplexer means comprising a plurality of switching stages whose inputs are connected together to the input of the second multiplexer means and having plural outputs constituting the plural outputs of the second multiplexer means and furthermore having respective control inputs, furthermore including a gating stage having outputs connected to respective control inputs of the second multiplexer means and having inputs connected to respective ones of the two mutually complementary outputs of the second bistable storage device for receipt therefrom of enabling signals preparing the gating stage to apply control signals to the control inputs of the second multiplexer means and having further inputs connected to the output of the first bistable storage device for receipt therefrom of control signals to be applied to the control inputs of the second multiplexer means.

15. In a focussing system as defined in claim 14, the second bistable storage devices being a D-flip-flop having a D-input and furthermore having Q and $\overline{Q}$ outputs constituting the two mutually complementary outputs, the D-input of the D-flip-flop being connected to the $\overline{Q}$ output thereof.

16. In a focussing system as defined in claim 15, the first bistable storage device also being a D-flip-flop having a D-input and furthermore having a Q output, said gating stage comprising two AND-gates each having a first input connected in common to the Q output of the first D-flip-flop and each having a second input connected to a respective one of the Q and $\overline{Q}$ outputs of the second D-flip-flop, the two AND-gates having outputs connected to respective ones of the control inputs of the second multiplexer means.

17. In a focussing system as defined in claim 14, furthermore including two gates having first inputs connected to respective outputs of said gating stage and also having second inputs, a time-delay stage having an input connected to the last output of the counter and having an output connected to the second inputs of both the two gates, the gates having outputs connected to the reset inputs of respective ones of the resettable digital signal storage devices.

18. In a focussing system as defined in claim 1, said circuit means furthermore including evaluating means connected to evaluate the states of the digital storage means to generate a command signal indicating that the subject-distance setting of the exposure objective should be changed to longer values, a command signal indicating that the subject-distance setting of the exposure objective should be changed to shorter values, or an equilibrium signal indicating that the subject-distance setting of the exposure objective need not be changed, depending upon the states of the digital storage means, the evaluating means furthermore including means operative in dependence upon the state of the digital storage means when the exposure objective is not in infinite-subject-distance setting and the true distance to the subject is too long for the reflected-back beam to be detected for generating a signal indicating that the subject-distance setting of the exposure objective should be changed to longer values, the last-mentioned means furthermore including switch means responsive to the exposure objective reaching its infinite-subject-distance setting for generating a pseudo-equilibrium signal indicating that the subject-distance setting of the exposure objective set to inifinite subject distance need not be changed.

19. In a focussing system as defined in claim 1, the plurality of photodetectors comprising two light detectors, the optical means projecting the reflected-back light beam onto the first light detector when the subject-distance setting of the adjusting means is shorter than the true distance to the subject and projecting the reflected-back light beam onto the second light detector when the subject-distance setting of the adjusting means is longer than the true distance to the subject, the digital storage means comprising two digital signal storage devices each receiving information from only a respective one of the two light detectors, said circuit means furthermore including evaluating means connected to evaluate the states of the digital signal storage devices and in dependence upon which of the two light detectors is in receipt of the reflected-back light beam generating either a command signal indicating that the subject-distance setting of the adjusting means is too short or too long.

20. In a focussing system as defined in claim 19, the evaluating means including means responsive to the exposure objective assuming its infinite-subject-distance setting and generating an infinite-setting signal in response thereto, the evaluating means furthermore including means operative in the absence of the infinite-setting signal and when the true distance to the subject is too long for the reflected-back light beam to be detected for ascertaining from the state of at least one of the two digital signal storage devices the fact that the reflected-back light beam is not detected and generating a command signal indicating that the subject-distance setting of the adjusting means should be made longer but ceasing to generate the last-mentioned command signal upon appearance of the infinite-setting signal.

21. In a focussing system as defined in claim 20, the two digital signal storage devices each being a one-bit-capacity flip-flop having mutually complementary Q and $\overline{Q}$ outputs, the evaluating means comprising two evaluating gates, the first evaluating gate having one input connected to the Q output of one of the flip-flops and another input connected to the Q output of the other of the flip-flops, the second evaluating gate having an input connected to the Q output of said other of the flip-flops and having a further input, and a limit switch operative for applying a signal to said further input of the second evaluating gate when the exposure objective is in its infinite-subject-distance setting, one of the two evaluating gates producing at its output the command signal indicating that the exposure-objective subject-distance setting should be made shorter, the other of the two evaluating gates producing at its output the command signal indicating that the exposure-objective subject-distance setting should be made longer.

22. In a focussing system as defined in claim 21, each of the two evaluating gates being an OR-gate.

* * * * *